July 28, 1925. 1,547,467
C. W. SWANSON
GEARING
Filed July 27, 1917
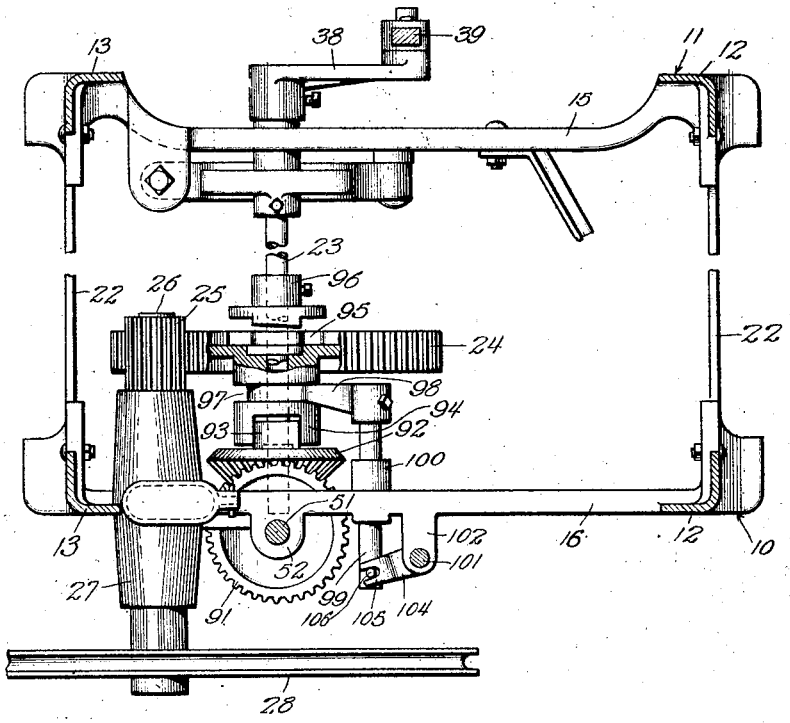

Patented July 28, 1925.

1,547,467

UNITED STATES PATENT OFFICE.

CARL W. SWANSON, OF CHICAGO, ILLINOIS.

GEARING.

Application filed July 27, 1917. Serial No. 183,027.

*To all whom it may concern:*

Be it known that I, CARL W. SWANSON, a citizen of the United States, residing at Chicago, in the county of Cook and State of Illinois, have invented certain new and useful Improvements in Gearing, of which the following is a specification.

This invention relates to improvements in gearing.

It is an object of this invention to provide a simple gearing by which a single source of power may be made to drive a vertical shaft continuously and a horizontal crank shaft at will of the operator.

The invention consists of the novel structure hereinafter described and more particularly pointed out and defined in the appended claim.

In the accompanying drawing which illustrates a preferred embodiment of this invention:

There is shown a plan view of the gearing involving this invention with parts in section.

As shown on the drawing:

The reference numerals 12 and 13 indicate the corner posts of a frame supporting a gearing embodying my invention. Said posts are joined by cross bars 15 and 22 and an additional cross bar 16 parallel to and above 15, which together with the corner posts comprise the frame. Mounted transversely on said cross bar 16 is an elongated bearing 27. Through said bearing 27 extends a short shaft 26. On the outer end of said shaft 26 is mounted a pulley 28, adapted to be driven by a suitable source of power, not shown. The inner end of said shaft 26 carries an elongated pinion 25. Meshing with said pinion 25 is a gear 24, rotatably and slidably mounted upon a parallel crank shaft 23. Said shaft 23 extends between cross bars 15, and constitutes the horizontal driving shaft for whatever piece of apparatus it may be connected to. Shaft 23 is shown here as having a crank 38 attached at one end outside of the cross bar 15. A link 39 shown in section connects the crank 38 to the apparatus to be driven (not shown).

The sliding gear 24 carries at opposite ends of its hub, clutch teeth 94, 95. A clutch collar 96, secured to shaft 23 on one side of the gear 24, is adapted to be engaged by the clutch member 95 when the gear 24 is moved toward the clutch collar 96 to drive the shaft 23. On the other side of the gear 24, a miter gear 92 on a hub 93 is loosely mounted on the shaft 23, with the hub 93 in constant sliding engagement with the clutch member 94. A second miter gear 91, mounted on a vertical shaft 51, meshes with said miter gear 92. The vertical shaft 51, having a bearing 52 in the cross bar 16, extends upwardly to operate any desired mechanism.

For the purpose of moving the sliding gear 24, I have provided an annular groove 97 on its hub. Engaging in said groove 97 is a forked arm 98. The arm 98 is secured on the end of a short rod 99, axially slidable through a bearing 100 on the cross bar 16. A control rod 101 extends vertically up the outer side of the cross bars 15 and 16, and is journalled in a hub 102 on the cross bar 16. The lower end of rod 101 carries an arm 104 with a forked end 105 for engaging a pin 106 in the outer end of the rod 99. Rotation of the rod 101 through any suitable means, not shown, slides the rod 99, thereby moving the gear 24 into or out of driving connection with the shaft 23.

The operation is, accordingly, as follows:

The driving source, such as a motor, acts through the pulley 28 to drive the shaft 26. The shaft 26 through the pinion 25 drives the gear 24. Said gear 24 is in constant connection through the clutch member 94 and the hub 93 with the miter gear 92. Consequently the vertical shaft 51, on the lower end of which is mounted the miter gear 91 in mesh with the miter gear 92, is driven so long as power is applied to the shaft 26. On the other hand, the horizontal crank shaft 23, on which gear 24 is rotatably and slidably mounted, is only driven when the gear 24 with its attached clutch member 95 is thrown over by the clutch operating mechanism, 101—104—105—98, into engagement with the clutch collar 96. The gearing therefore, provides for a continuous transmission of power to a vertical shaft and for a clutch operated transmission of power to a horizontal shaft.

I am aware that many changes may be made and numerous details of construction may be varied through a wide range without departing from the principles of this invention, and I therefore do not purpose limiting the patent granted hereon, otherwise than necessitated by the prior art.

Having described my invention what I claim is:

In a driving mechanism, a frame, gearing mechanism supported by said frame and comprising an elongated bearing, an elongated pinion rotatably supported by said bearing, a crank shaft supported by said frame, a gear axially slidable and rotatably supported upon said shaft for meshing relation with said pinion, said gear having clutch members upon the opposite ends of its hub; a cooperating clutch collar secured to said shaft; a vertical shaft supported by said frame, a miter gear secured to said vertical shaft; a second miter gear loose on said crank shaft meshing with said first miter gear and having a clutch member cooperating with one clutch member on said gear, and shiftable means to slide said gear on said crank shaft into and out of engagement with said clutch collar for rotation of said crank shaft and said vertical shaft or for rotation of said vertical shaft only.

In testimony whereof I have hereunto set my hand.

CARL W. SWANSON.